United States Patent

[11] 3,602,281

[72] Inventors Gerald R. Anderson Campbell;
William C. Wann, Jr., San Jose, both of, Calif.
[21] Appl. No. 5,073
[22] Filed Jan. 22, 1970
[45] Patented Aug. 31, 1971
[73] Assignee FMC Corporation
San Jose, Calif.

[54] FRUIT-ORIENTING SYSTEM
14 Claims, 20 Drawing Figs.
[52] U.S. Cl. .................................................... 146/52, 198/33 AA
[51] Int. Cl. ..................................................... A23n 3/12
[50] Field of Search .......................................... 146/51, 52; 198/33 AA

[56] References Cited
UNITED STATES PATENTS
3,016,076  1/1962  Keesling ..................... 146/52
3,156,277  11/1964  Keesling ..................... 146/52
3,270,788  9/1966  Armstrong ................... 146/52
3,310,084  3/1967  Anderson et al. ............. 146/52

*Primary Examiner*—William S. Lawson
*Attorneys*—F. W. Anderson and C. E. Tripp

ABSTRACT: Apples are oriented for coring on a cup conveyor. Indent-finder wheels are rotatably mounted below the cup conveyor on a reciprocating finding-wheel carriage which is linked for reciprocation with an apple-coring carriage. A bellcrank linkage arrangement, part of which is mounted on the coring carriage is operated to retract the finder wheels near the end of their advanced reciprocation and to reintroduce the wheels to a new set of cups after they have been reciprocated in a direction contrary to the cup-conveyor motion. Successive finder wheels are rotated in opposite directions. The conveyor cups are vertically vibrated to insure that fruits of all sizes are oriented by the finder wheels, without requiring the use of locating rings disposed above the cups. In a modified form, the finder wheels are on a chain which advances with the fruit cups.

FIG_4

FIG_10

FIG_11

FIG_12

FIG_13

3,602,281

FRUIT-ORIENTING SYSTEM

FIELD OF THE INVENTION

This invention relates to the orientation of apples of the like for coring, and more particularly relates to a mechanism associated with a reciprocating coring carriage for finding the indents of the apples while they are moving in a cup conveyor, as well as for vibrating the cups to make such finding possible over wide range of fruit sizes without requiring locating rings disposed above the fruit cups.

DESCRIPTION OF THE PRIOR ART

The use of a reciprocating coring head or carriage in conjunction with a longitudinally advancing cup conveyor in an apple-coring machine is shown in U.S. Pat. to Anderson et al., No. 3,310,084, issued Mar. 21, 1967. A similar coring head appears in the U.S. Pat. to Anderson et al., No. 3,199,558, issued Aug. 10, 1965, and a head for pears is shown in U.S. Pat. to Anderson, No. 3,246,676, issued Aug. 19, 1966.

The use of finder wheels for finding the indents of fruit in association with pocketed cups is shown in the U.S. Pats. to Carroll, No. 2,220,511, issued Nov. 5, 1940; No. 2,232,208, issued Feb. 18, 1941; and No. 2,687,206, issued Aug. 24, 1954. These patents required grading of the fruit in association with a locating ring disposed above the cup.

Different systems for confining the fruit by movable jaws above the cups which operate in conjunction with finding wheels are shown in U.S. Pat. to Keesling, No. 2,918,098, issued Dec. 22, 1959 and in the aforementioned Carroll U.S. Pat. No. 2,687,206.

Apparatus for orienting apples by supporting them on a flat, generally horizontal surface and vibrating the surface as a sole means for causing the indents to progress towards the flat surface for subsequent coring is shown in the U.S. Pat. to Armstrong, No. 3,270,788, issued Sept. 6, 1966.

The U.S. Pat. to Carroll et al., No. 2,655,247 issued Oct. 13, 1953 teaches the use of a reciprocating indent-finder tip or finger which projects through a rubber cup and has a stroke of one thirty-second to one-sixteenth of an inch at a frequency of 850 to 1,859 per minute.

SUMMARY OF THE INVENTION

The present invention will be described in connection with an apple-coring machine, but it will be understood that the invention has utility for processing other type of fruit having blossom indents or the like. The apple-orienting system of the present invention is adapted for use on the apple-coring machine of the aforesaid Anderson et al. U.S. Pat. No. 3,310,084.

As previously mentioned, the general type of finding or orientation of the apples or fruits employed in the present invention embodies the use of a conveyor having shallow cups with apertured bottoms through which protrude rotating finder wheels of the general nature of the aforesaid U.S. Pat. to Carroll, No. 2,232,209, FIG. 11. Heretofore, in commercial practice it has been found necessary to process the fruits in groups or graded sizes in order that this type of indent orientation be effective. This has required the use of guide rings, such as the ring 18 of the aforesaid FIG. 11 of the Carroll patent, disposed above the pockets. The guide rings were necessarily of a diameter chosen to accommodate the largest fruit size within a graded range, but it was necessary to change guide rings to handle fruit sizes of various graded ranges. Some machines have provided adjustable jaws above the fruits for moving close to the fruit during The orientation process without gripping them, but this requires a complicated mechanism which is dispensed with, along with the guide ring such as a ring 18 of Carroll, under the present invention.

In the present invention, the cups are made large enough to handle even the largest fruit, as well as the smallest fruit within an expected crop. The finding wheels and cups are so operated that the small fruits will not be "lost" during the finding process and the large fruits will not be unduly gouged and yet can be accommodated, all of which are attainable without the use of the interchangeable guide rings previously mentioned.

In the fruit-processing apparatus of the present invention, the cups are made large enough to handle the largest apples in the range and they have concave bottoms that slope right to the finder wheels which project up through central apertures in the cups. It has been found that over 90 percent orientation is attainable, even with large pockets and small fruit, when the cups are vertically vibrated over a stroke in the range of one-sixteenth to five thirty-seconds of an inch at a frequency of from 200 to 675 cycles per minute.

Another feature of the present invention also relates to the ability of efficient finding mechanism to handle small fruit as well as large fruit. Since the cups are made large enough to handle large fruit, the rotation of the finding wheels in one direction when operating on small fruit crowds or tumbles the fruit to one side of the cups out of the range of effective action of the finders. In accordance with the present invention, the fruit is successively presented to finder wheels which rotate in opposite directions. Thus, if the previous finder wheel has caused the fruit to come to rest at one side of the associated cup, the next, reversely rotating finder wheel, will pick up the fruit and bring it into a more central position whereupon it is further rolled or tumbled by the finder wheel as part of the indent-finding process. This represents a simplification and an improvement over such finders as that of the aforesaid Carroll U.S. Pat. No. 2,687,206, whereby oscillations are imparted to the finder wheels on a vertical axis. Such oscillations will not find fruit that has been shoved to one side of a large cup with the efficiency of the reversed rotation finders of the present invention. The 90° wheel offsets of the aforementioned Carroll U.S. Pat. No. 2,220,511 are likewise inefficient in correcting pushoff by a preceding wheel.

DETAILED DESCRIPTION

As previously mentioned, the orienting apparatus of the present invention is shown fitted to an apple-coring machine such as that shown in the aforementioned U.S. Anderson et al. Pat. No. 3,310,084, although in the broader aspects of the invention, the orienting device can be fitted to other fruit process machines wherein indent finding is required.

Figures 1, 2, 3:
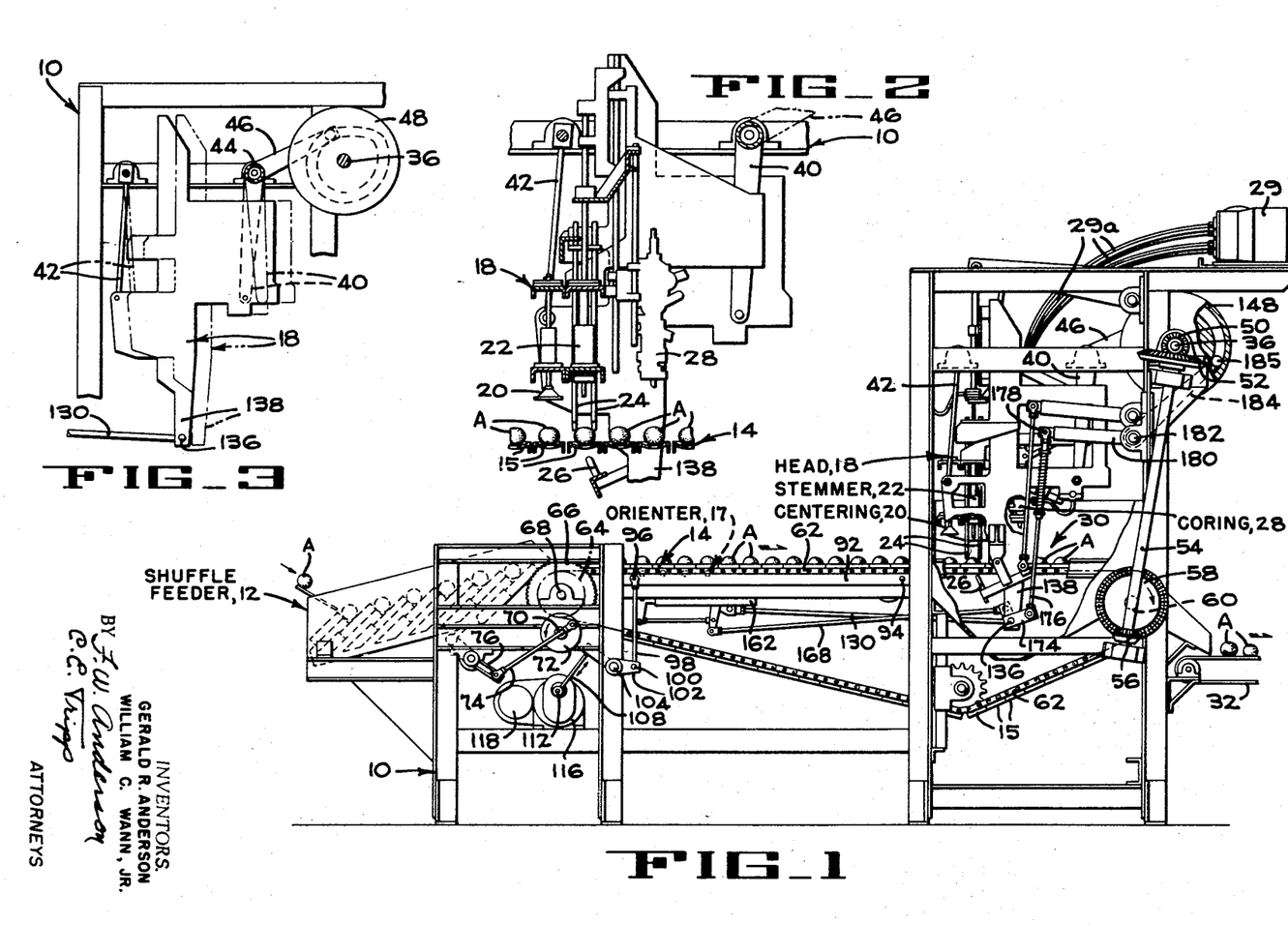
FIG. 1 is a side elevation of an apple coring machine embodying the present invention.
FIG. 2 is a simplified enlarged view of the coring head.
FIG. 3 is a diagram showing longitudinal oscillation of the coring head.

Referring to FIG. 1, this is a side elevation of an apple-coring machine embodying the orienting device of the present invention and illustrating other units of the complete apple-processing machine, the details of which are not critical to the present invention but which are shown to represent a complete adaptation of the invention to a specific fruit-processing machine.

The machine of FIG. 1 has a frame structure indicated generally at 10, the details of which are not important. On the frame structure is a shuffle feeder 12 illustrated like that of the U.S. Chamberlin Pat. No. 3,088,577, issued May 7, 1963. This feeder receives apples A and supplies them in transverse rows to a continuously moving cup conveyor 14 having cups 15 (see FIG. 4 which shows rows of cups 15 on the cup conveyor 14). Since the purpose of the cup conveyor 14 is to convey the apples to a processing head that requires the vertical orientation of the stem blossom axis, an orienter 17 of the present invention is fitted below the cup conveyor adjacent its apple-receiving end.

After having been oriented by the orienter 17 so that the stem indents of the apples are down (see the right-hand portion of FIG. 9A), the apples are presented to a longitudinally reciprocating processing or coring head indicated generally at 18. This head includes vertically reciprocable apple-retainer cups 20, vertically reciprocable stemmers 22 and indexing pins 24 for aligning the stemmer with the drive chains of the conveyor 14. Below the stemmers 22 are vertically reciprocable centering pins 26 for lifting the apples by their indents during the stemming operation. These pins may be rotated, by means not shown, as is disclosed in the copending application of G. R. Anderson Ser. No. 5,074, filed Jan. 22, 1970 (SJ 5609) assigned to FMC Corp.

Downstream of the stemmers 22 is a coring unit 28 having rotating coring knives driven by a motor 29 and flexible shafting 29a. It is to be understood that in the side view of FIG. 1 only one centering unit, stemmer and coring unit are shown but that these are provided in rows across the cup conveyor 14, there being one tool for each of the cups 15 in a row. The stemmed and cored apples leaving the coring unit 28 are carried by the cup conveyor 14 to a wash station 30 and thereafter delivered to a take away conveyor 32.

The Oscillating Head

The details of the various tools mounted on the head 18 and the manner in which they are operated, raised and lowered are not critical to the present invention. A head like that illustrated herein diagrammatically is shown in the aforesaid Anderson et al. U.S. Pat. No. 3,199,558 as well as in the U.S. Pat. to Anderson, No. 3,246,676, issued Apr. 19, 1966 and Anderson et al. No. 3,310,084, issued Mar. 21, 1967.

The drive for reciprocating the head 18, for raising and lowering of the tools and for the cup conveyor 14 is taken from a main cross-shaft 36. This shaft is driven through a motor gear reduction, as disclosed in the aforementioned Anderson et al., U.S. Pat. No. 3,310,084. The shaft 36 mounts various cams (not shown) for raising and lowering the various tools on the head 18.

In the machine of the present invention as in those of said prior patents, the head 18 is reciprocated longitudinally and it advances in synchronism with the advance of the cup conveyor 14. Thus the tools can core the fruit while moving along with the conveyor. In order to accommodate such reciprocation of the head (which is advanced with the conveyor when the tools are lowered and restored to an upstream conveyor position when the tools are raised), the head is supported from the frame 10 on depending oscillating arms 40 (FIGS. 2 and 3) and follower links 42. These are long enough to give substantially a straight line horizontal motion to the head. The oscillating arms 40 depend from a cross-shaft 44 which carries a cam follower arm 46 (FIG. 3). The cam follower arm 46 is reciprocated by a disc cam 48 keyed to the main drive shaft 36 previously referred to. Thus rotation of the drive shaft 36 causes a horizontal oscillation of the head 18 and the cam 48 is contoured so that as the head is moving with the conveyor 14, the speed of the two devices are matched.

Conveyor Drive

Since the conveyor 14 must be synchronized with the head 18, the conveyor 14 is also driven from the main shaft 36, as shown in FIG. 1. In the illustrated construction, a bevel pinion 50 and the shaft 36 drives a bevel gear 52 on a vertical shaft 54. At the lower end of shaft 54, a bevel pinion 56 drives a bevel gear 58 on a cross-shaft 60 for the cup conveyor. The cup conveyor side chains 62 (FIG. 4) pass over drive sprockets on the shaft 60 which are hidden by the bevel gear 58 in FIG. 1. At the receiving end of the conveyor, the conveyor chains pass over idler sprockets 64 shown in dotted lines in FIG. 1. This drive insures synchronization of the cup conveyor 14 with longitudinal oscillation of the coring head 18.

Shuffle Feeder Drive

The shuffle feeder 12 is synchronized with the cup conveyor 14. The shuffle feeder is driven by a gear 66 (FIG. 1) on the idler sprocket shaft 68 of the conveyor. The gear 66 drives a pinion not seen in FIG. 1 on a cross-shaft 70 which shaft operates a crank disc 72 having pinned thereto a feeder link 74. Link 74 oscillates a feeder crank lever 76 for operating the shuffle feeder, all as described in the aforementioned Chamberlin U.S. Pat. No. 3,088,577, the details of which are not critical to the present invention. With this feeder, randomly supplied apples are formed into rows which are presented row by row to the rows of conveyor cups 15.

Orienter Features

Figure 4:
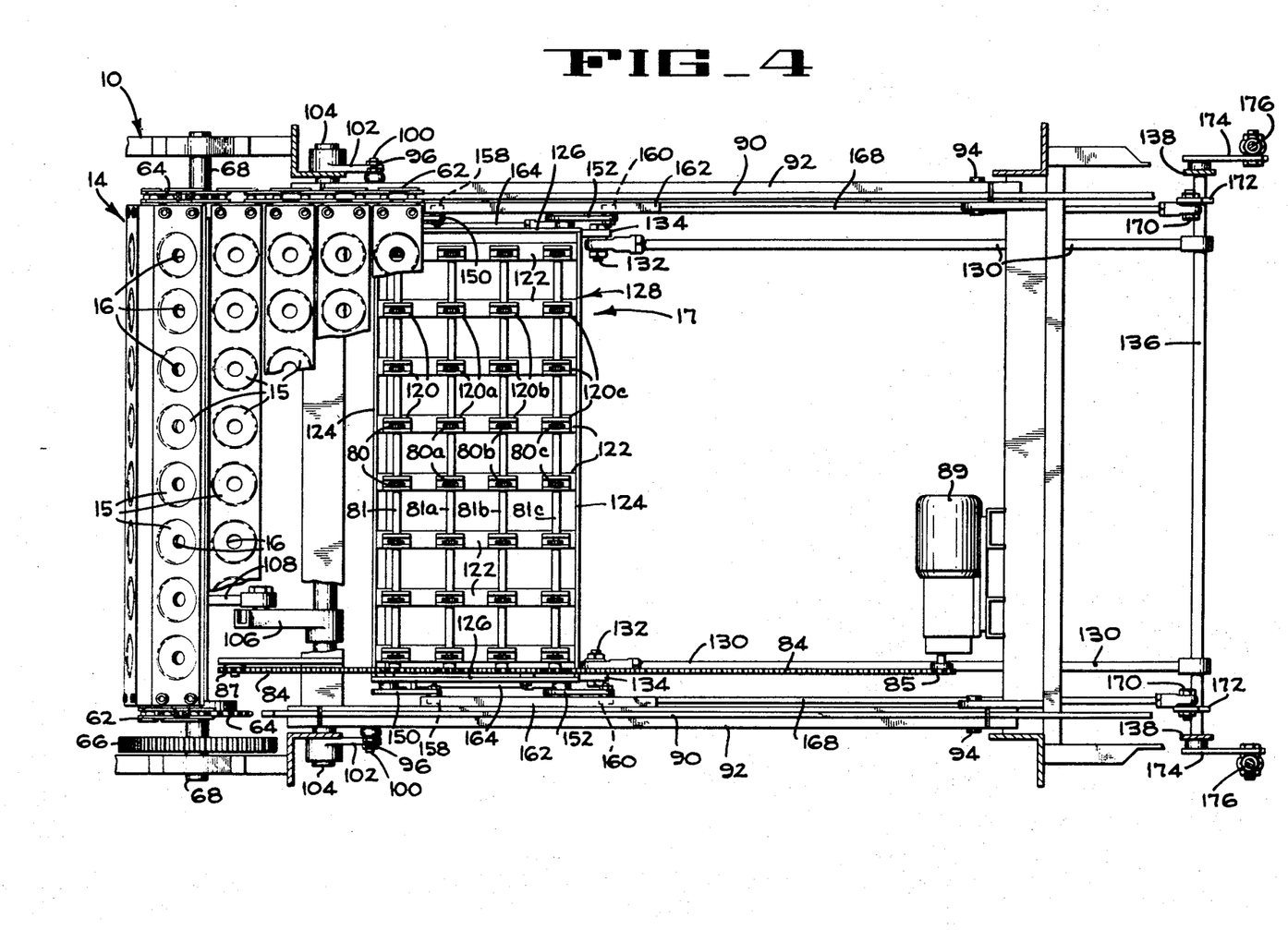
FIG. 4 is a fragmentary plan of the orienting mechanism.

In the construction of the orienter 16 being described herein, and in accordance with the present invention, three features are incorporated. First, the cups 15 on the cup conveyor 14 are vertically oscillated at a frequency of several hundred cycles per minute. The orienter includes rotating finder wheels which project up through apertures in the cups. As seen in FIG. 4, four rows of finder wheels are provided, these being indicated at wheels 80, 80a, 80b and 80c mounted on shafts 81–81c respectively. It is a second feature of the present invention that successive finder wheels rotate in opposite directions.

The third feature of the orienter is that when the finder wheels are in their finding position engaging the apples A in their respective cups, these wheels are moved longitudinally with the cup conveyor 14 to prolong the finding action.

Cup Oscillation

Figures 5, 6, 7, 8:
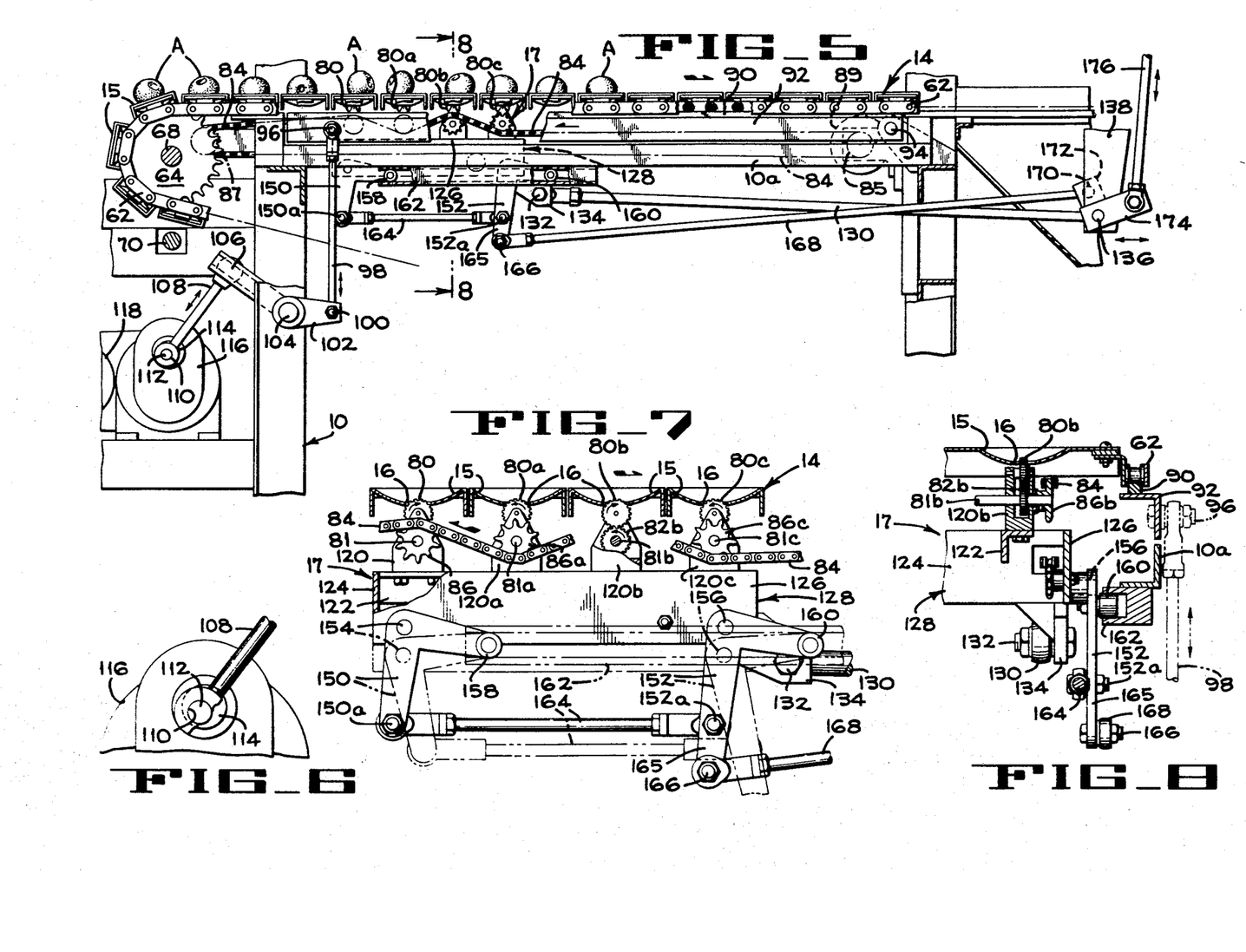
FIG. 5 is a side elevation of the orienting mechanism.
FIG. 6 is an enlarged view of the drive eccentric for the finder oscillator.
FIG. 7 is an enlarged fragmentary elevation of the finder wheel control mechanism.
FIG. 8 is a section taken on line 8–8 of FIG. 5.

The mechanism for vertically oscillating the cup conveyor 14 during the finding operation is shown at reduced scale in FIG. 1 and in more detail in FIGS. 4, 5, 6 and 8. Referring to these figures, the conveyor flight chains 62 ride on tracks 90 which run longitudinally at each side of the orienting unit. These tracks are supported on angle bars 92 (FIG. 8) the downstream end of which are pivoted to the frame 10 at 94 (FIG. 5). The upstream ends of the angle bars 92 are pivoted at 96 to vertically reciprocating links 98 (FIGS. 5 and 8). The lower end of the links 98 are pinned at 100 to an oscillating crank 102, there being one crank mounted at each end of a rock shaft 104 as seen in FIG. 4. The rock shaft, in turn, is oscillated by a crank arm 106 pivotally connected to a connecting rod 108 (FIG. 5). The other end of the connecting rod is pivoted at 110 to an eccentric 112 (FIGS. 5 and 6) which eccentric is driven by a shaft 114 of a gear-reduction unit 116, the latter being driven by an oscillating motor 118 (FIG. 1). Thus the motor 118 rotates the eccentric 112 at several hundred cycles per minute. This, in turn, reciprocates the connecting rod 108, rock shaft 104, cranks 102, links 98, and the cup-supporting frame and track assembly 92, 90 for imparting short-stroke, rapid vibration to the conveyor cups 15 in order to assist in the indent-finding operation.

Finder Wheel Advance and Retraction

In the embodiment of FIGS. 1–8, the finder wheels 80, etc. are advanced in synchronism with the cup conveyor 15, are then lowered and retracted, and are raised on the backstroke for reengaging fruit in the cups. The mechanism for performing these operations will now be described. Referring to FIGS. 4, 5, 7 and 8, the finder-wheels shafts 81, etc. extend through brackets 120–120c (FIG. 7) which project upwardly from laterally spaced longitudinal rails 122 (FIG. 4). The ends of the rails 122 are supported on cross frame members 124 (FIG. 4) which frame members are connected by sideplates 126 (FIG. 8). The construction just described provides a carriage 128 for the four rows of eight finder wheels.

The carriage 128 just described is advanced in synchronism with the conveyor 14 when the carriage is in its raised position and the carriage is retracted when in its lowered position by links 130. These links are pivotally connected at 132 to brackets 134 depending from the finder-wheel carriage. The other ends of the carriage-reciprocating links 130 are pivotally connected to a rock shaft 136 which reciprocates with the coring head. Rotation of the rock shaft 136 does not affect the carriage-reciprocating links 130, but does provide a carriage raising and lowering action to be described presently. The rock shaft 136 (FIG. 4) can oscillate in depending mounting brackets 138 that project downwardly from the coring head 18, as seen in FIGS. 1 and 3. Thus with the construction just described, the reciprocation of the coring head 18 and the integral, depending rock shaft brackets 138 under the action of the cam 48 on the main drive shaft 36 (FIG. 3) oscillates the links 130 and effects a corresponding reciprocation of the finder-wheel carriage 128.

Finder-Wheel Lowering and Raising

The mechanism for lowering the finding wheels from their respective conveyor cups 15 and the end of the advance stroke of the finder-wheel carriage, and raising them again when the carriage has been retracted so that the finder wheels and reset cups will now be explained. That function is performed by a link and crank mechanism operated from a cam 148 (FIG. 1) on the main cross-shaft 36 for the machine and is constructed as follows:

The finder carriage 128 is mounted for the advance and retract motion just described by means of bellcranks 150, 152 pivotally supporting the end plates 126 of the carriage at 154, 156 (FIG. 7). The free ends of bellcranks 150, 152 mount rollers 158, 160 which slide in tracks 162 at each side of a machine frame, these tracks being supported by longitudinal frame members 10a as best seen in FIG. 8. The construction just described permits oscillation of the bellcranks to raise and lower the carriage of the finder wheels while accommodating longitudinal reciprocation of the carriage in synchronism with the cup conveyor as previously explained.

In order to raise and lower the finder-wheel carriage, the lower ends of the bellcranks 150, 152 are pinned at 150a, 152a to connecting links 164 for simultaneous operation. (FIGS. 5 and 7). Thus as seen in phantom in FIG. 7, longitudinal reciprocation of the links 164 raise and lower the bellcrank pivots 154, 156 relative to the rollers 158, 160 which remain vertically stationary. Oscillation of the bellcrank pivots 154, 156 oscillates the finder carriage 128 vertically. In order to oscillate the bellcranks as described, the bellcranks 152 have lowermost extensions 165 (FIG. 7) which are pivoted at 166 along generally horizontally running links 168 (FIG. 5). The other ends of the links 168 are pivoted at 170 to cranks 172 connected at opposite ends to the aforementioned rock shaft 136. It will be recalled that the rock shaft 136 is mounted in brackets 138 depending from the coring head 18 and hence reciprocates with the coring head. Cranks 174 are rigidly secured to the outer ends of the rock shaft 136. The cranks 174, the rock shaft 136 (and hence the carriage-lifting links 168) are oscillated by generally vertical links 176 which, as seen in FIG. 1, are pivoted at 178 to raising and lowering cranks 180. The cranks 180 are keyed to a cross-shaft 182 from which projects a cam follower arm 184. This arm carries a roller 185 which rides in the slot in a cam 148 on the cross-shaft 136 previously referred to. Thus rotation of the cross-shaft 136 reciprocates the coring 18 (FIG. 3), head, drives the cup conveyor 14 (shaft 54, FIG. 1) and raises and lowers the finder-wheel carriage 128 (cam 148) as just described. As previously mentioned, longitudinal reciprocation of the coring head also causes longitudinal reciprocation of the finder-wheel carriage 128 via the links 130 (FIG. 5) as also previously described. With the construction described all key parts of the apparatus are maintained in synchronism during operation of the machine.

Finder-Wheel Rotation

Another feature of the invention is that adjacent finder wheels 80–80c are rotated in opposite directions. This is one of the features of the present invention which renders fruit guiding and centering rings above the cups 15 unnecessary. The finder-wheel shafts 81–81c each carry small pinions such as the pinion 82b shown in FIGS. 7 and 8. The finder wheels themselves are formed as gears that mesh with the pinions 82, etc. on the shafts 81–81c. An endless chain 84 is trained around sprockets 86–86c (FIGS. 5 and 7) in a sinuous path which causes adjacent finder-wheel shafts to rotate in opposite directions. The chain 84 is driven by a sprocket 85 (FIG. 5) on a motor 89. The other end of the finder-wheel chain 84 passes around an idler pinion 87 (FIG. 4) and indicated in dotted lines at FIG. 5. The construction just described permits oscillation of the finder-wheel carriage 128 while the wheels are driving the finder wheels by means of the motor 89. Although the advance and retrograde motion of the finder-wheel carriage may add to or subtract slightly from the rotation imparted to the finder wheels by the moving endless chain 84, this feature has no effect on the mode of operation of the finding system. In a preferred embodiment of the invention the finder wheels are in the order of 1.1875 inches in diameter and are rotated at about 300 r.p.m. by the motor 89 and associated chain and sprocket construction just described.

Summary

To summarize some of the essential features of the apparatus of an apple-coring machine embodying the present invention, synchronized portions of the mechanism are driven from a cross-shaft 36 shown in FIG. 1. This cross-shaft carries a cam 48 (FIG. 3) which operates levers 46 and 40 to longitudinally advance and retract the coring head 18 as indicated in FIG. 3. The advance of the coring head 18 to the right as seen in FIGS. 3 and 1 is synchronized with the continuous motion of the cup conveyor 14. This synchronous drive is obtained by the vertical bevel gear shaft 54 (FIG. 1) driven from the cross-shaft 36 and connected to drive the cup-conveyor chains 62. Links 130 are connected between coring head brackets 138 and the carriage 128 that mounts the finder wheels of the orienting device so that the finder-wheel carriage moves in longitudinal synchronism with the coring head 18. The cam 148 on the main drive shaft 36 (FIG. 1) operates linkage 176, 174, 172, 168 and bellcranks which lowers and raises the finder-wheel carriage so that a given finder wheel successfully enters adjacent finding-wheel cups. This conduction provides engagement between the finder wheels and the fruit in the cups for about two-thirds of a distance representing the spaces between adjacent rows of cups. Successive rows of finding wheels are reversely rotated by the endless chain 84 trained in a sinuous fashion about the sprockets and driven by an electric motor 89. The cup conveyor chains 62 are vertically oscillated by a separate electric motor mechanism including linkages 98–108 and the motor and gearbox assembly, 118, 116.

Illustrations of Carriage Motion

Having described in general the mode of operation of the finding system of the present invention as it is embodied in an apple-coring machine, a more detailed explanation of the motions of the finder carriage in a cycle will now be provided in conjunction with FIGS. 9A to 9D.

Figure 9A:
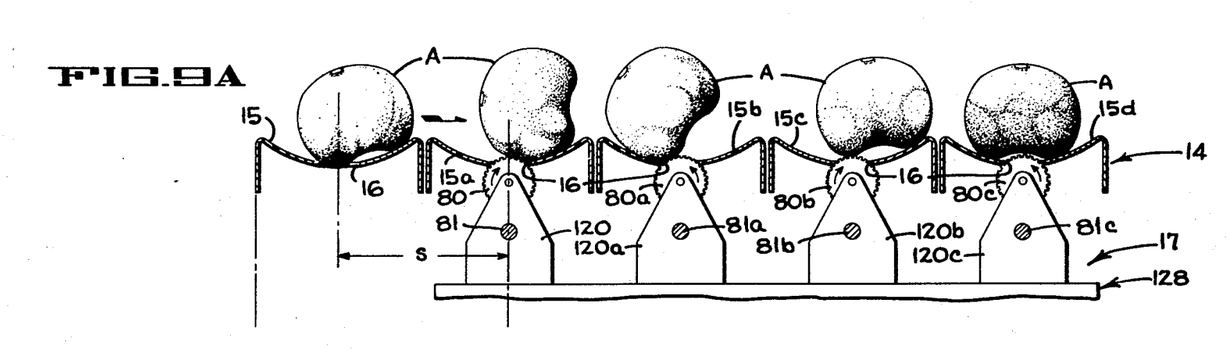
FIGS. 9A to 9D are schematic diagrams showing various stages of finder-wheel motion.

In FIG. 9A, five conveyor cups 15–15d are shown. The four finder wheels 80–80c are illustrated in their fully advanced and fully raised positions with the wheels projecting through apertures 16 in the cups for operating on apples A supported by the cups. Since the four rows of finder wheels are moved together, only the row represented by the finder wheel 80 shown in FIGS. 9A–9D will be described in this operational sequence. The spacing between adjacent cups 15 of the cup conveyor 14 is indicated at s in the diagram.

Figure 9B:
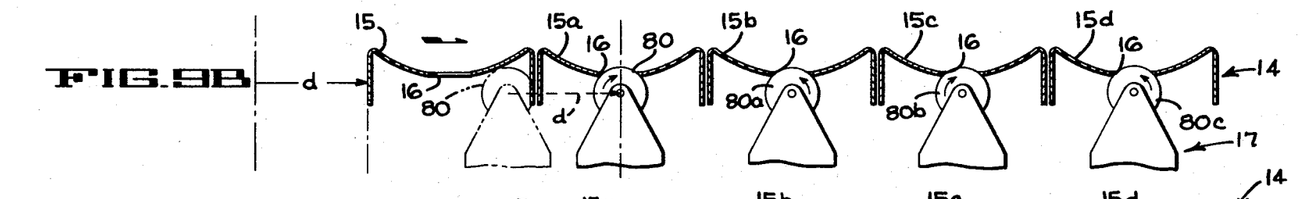

In FIG. 9B the conveyor cups have advanced by a distance d, which represents about two-thirds of the spacing s between the cups. The finder-wheel carriage 128 and all finder wheels are still in their raised position and the linkage 130, etc. (not shown in these views) has advanced the finder wheels 80 by the same distance d over which the cups have passed. Thus, in FIG. 9B, the finder wheel 80 is still projected through the aperture 16 in the cup 15a but this represents the end of the finding stroke of the finding wheel 80 in association with its cup 15a.

Figures 9C, 9D:
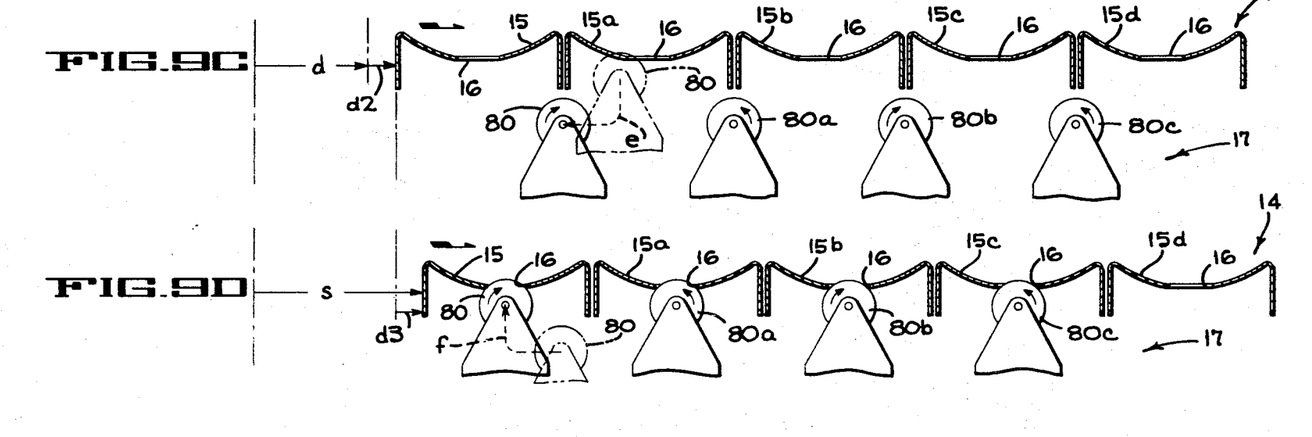

In FIG. 9C the finder-wheel carriage and the finder wheels have been lowered (the bellcranks 150, 152 etc.) and retracted half way (links 130 etc.) as indicated by the (L-shaped) dashed arrow $e$ associated with the finder wheel 80. During this lowering and initial retraction $e$ of the finder wheels, the cup conveyor 14 advances the cups by an additional, smaller distance $d2$. Thus the finder wheel 80 has left the cup 15a with which it was previously associated and is approaching the oncoming cup 15.

In FIG. 9D the cup conveyor has advanced an additional increment $d3$ so that the total advance between the condition of FIG. 9D and that of FIG. 9A at the start of the cycle equals the spacing $s$ between adjacent cups. The finder wheel 80 has completed its retraction and has been raised as shown by the dotted L-shaped arrow $f$ and is now protruding through the aperture 16 in the cup 15 for finding action upon the apple in the cup. The apples have been omitted from the cups of FIGS. 9B to 9D for clarity. The manner in which this synchronized action of the finder-wheel carriage and cup conveyor is attained has been previously explained in the detailed description of the apparatus. The vertical oscillation of the cups 15 by means of the oscillating motor 116 (FIG. 5) and the linkages associated therewith is not illustrated in the diagram of FIGS. 9A to 9D.

Illustrations of Finding Action

FIGS. 10 to 13 are diagrams illustrating the effect of reversed finder-wheel rotation on successive finding operations on a single Apple A in a single cup 15a. It is to be understood that the conditions illustrated in these figures are merely presented for purposes of explaining principles. They are not necessarily representative of any actual operating effects on any given apple.

Figure 10:
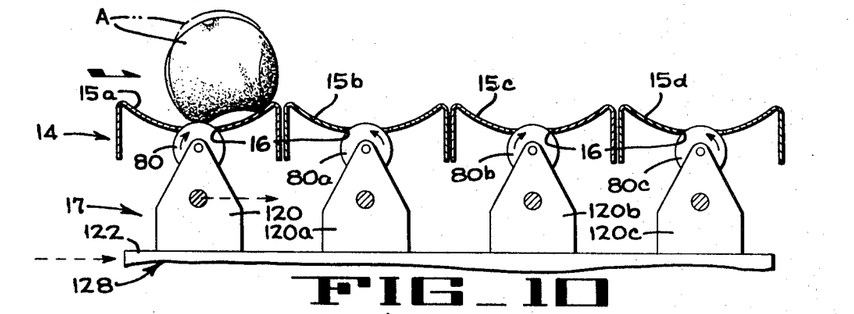
FIGS. 10–13 are schematic diagrams showing the action of successive finder wheels on an apple in a given conveyor cup.

In FIG. 10, the apple A is shown in its cup 15a it being assumed that the finder wheel 80 and its carriage 128 are at the start of the synchronized advance stroke with the moving cup conveyor 14, as indicated by the dashed arrow at the finder-wheel carriage. The finder wheel 80 has started to rotate the apple A in the cup 15a to find the indent thereof. As seen in broken lines, it will be assumed that during the finding operation, the finder wheel 80 will push the apple A to the right side of the cup, this being a situation where the apple A is considerably smaller than the cup.

Figure 11:
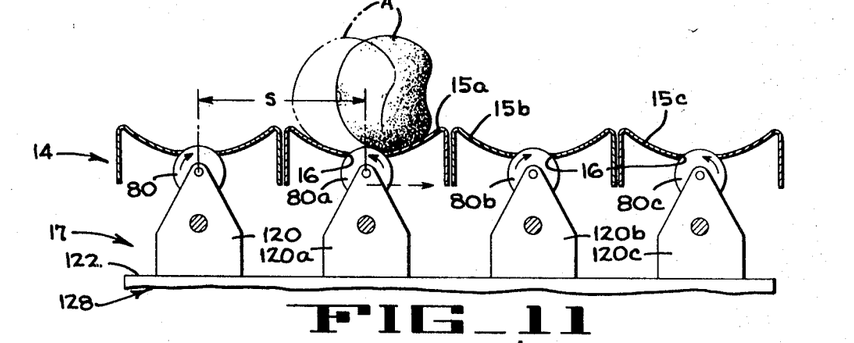

In FIG. 11, the cup 15a has advanced by the distance $s$ (the spacing between adjacent rows of cups) from the position of FIG. 10. The finder-wheel carriage has been lowered, retracted and raised again between FIGS. 10 and 11, so that finder wheel 80a is now the wheel which projects up through the aperture 16 in the cup 15a under discussion. The finder wheel is about to engage the apple A where it was previously left at the right of cup 15a. Since this finder wheel is rotating counterclockwise, it will pick up the apple that has been pushed to one side of the cup and may roll or tumble it over towards the other side of the cup, as shown in broken lines in FIG. 11.

Figure 12:
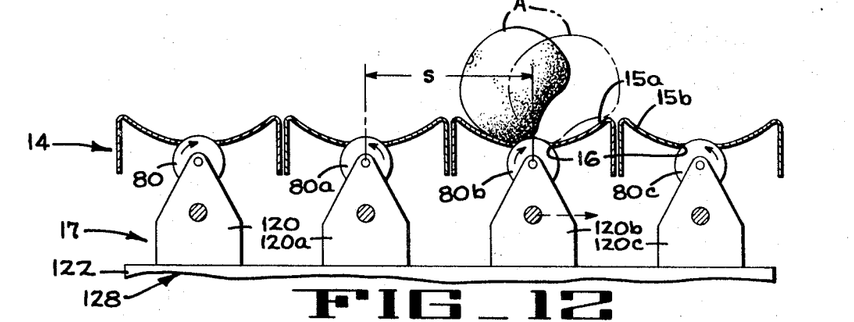

In FIG. 12 the cup conveyor has again advanced by another distance $s$. The finder carriage has been lowered and raised and is about to advance again with the finder wheel, 80b now operating at the cup 15a. This finder wheel is rotating clockwise and will pick up the apple A (solid lines) that was rolled to the left of cup 15a by the wheel 80a. The wheel 80b will further roll or tumble the apple to find the indent and possibly will push it towards the right of its cup, as shown in broken lines.

Figure 13:
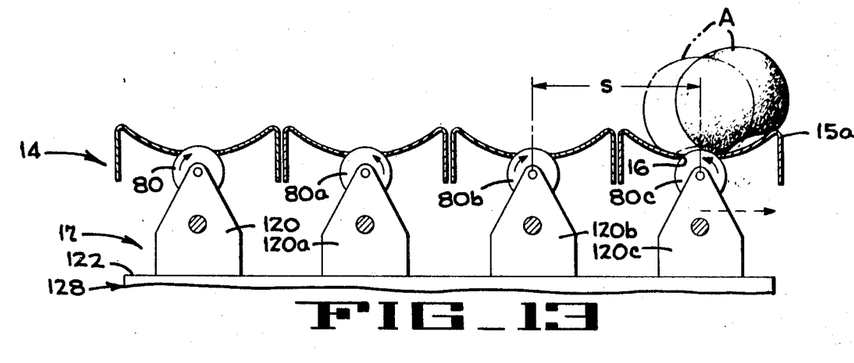

In FIG. 13, the cup conveyor has again advanced by the distance $s$ and the finder wheel 80c is now operating at cup 15a. This find wheel is rotating counterclockwise. The finder wheel 80c will pick up the apple which had been pushed toward the right of the cup by the finder wheel 80b (solid lines) and will roll or tumble it until the indent is found (broken lines). Thus the diagrams of FIGS. 10–13 illustrate the principle of the mode of operation of the reversely rotating finder wheels.

Modified Form

FIGS 14–17 illustrate a modified embodiment of the invention wherein the finder wheels are advanced continuously and in synchronism with the cup conveyor, instead of being reciprocated therewith as in the previous embodiment. As will be seen in the embodiment now described, the finder wheels are mounted on endless chains which are driven in synchronism with the cup conveyor, instead of being reciprocated therewith as in the previous embodiment. As will be seen in the embodiment now described, the finder wheels are mounted on endless chains which are driven in synchronism with the cup conveyor.

Figure 14:
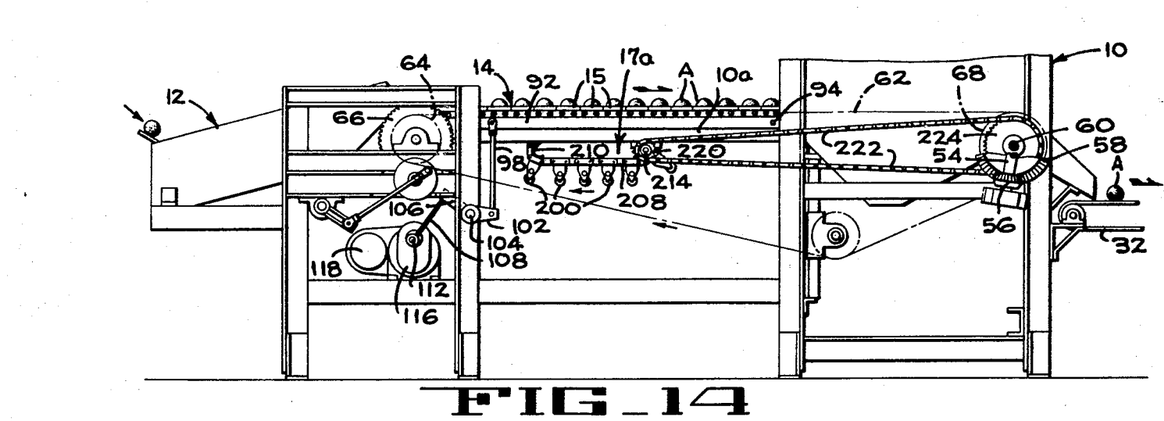
FIG. 14 is a side elevation of a modified embodiment of the invention.

Referring to FIGS. 14–17, the only structure that has been modified is the orienter, now indicated generally at 17a. The general construction of the machine upon which the orienter is installed is like that previously described, except that in the form of FIGS. 14–17 the fruit-processing head 18 does not have link connections to the orienter carriage for longitudinally and vertically reciprocating the finder wheels, as in the previous embodiment. In place of the aforesaid link connections, a chain drive is taken off cross-shaft 60 (FIG. 14).

Finder Wheel Conveyor

In the embodiment being described the finder wheels are all indicated at 200, and are on an endless conveyor. The wheels are mounted on shafts 202 (FIG. 16) rotatable in bifurcated brackets 204. These brackets project from flight bars 206, the ends of which are mounted on laterally spaced chains 208. Each of the chains 208 rides on a curved track shoe 210 (FIGS. 15 and 16) which is supported on the frame member 10a described in connection with the previous embodiment.

The finder bar chains 208 are driven by pinions 212 keyed to a cross-shaft 214 mounted in bearings 216 on each side on the machine on the frame 10a. The chain pinion shaft 214 is driven by a pinion 220, a chain 222 and a sprocket 224 keyed to the driving cross-shaft 60 previously described. It will be recalled that the driving cross-shaft 60 carries the drive sprocket 68 for driving the chains 62 of the cup conveyor 14. The chain drives just described are selected so that the linear speed of the finder wheels 200 matches the linear speed of the cup conveyor 14 and the machine is set up so that the finder wheels 200 are spaced by distance equal to that of the cups 15.

Thus, in the construction just described, four finder wheels 200 (FIG. 15) will advance continuously along with the cups 15 in the cup conveyor 14 and each finder wheel will remain in operative relation to cup 15 throughout a travel of the cup conveyor represented by the spacing of substantially three rows of cups along the conveyor.

Finder Wheel Rotation

Means are provided to cause each finder wheel 200 to alternately reverse its direction of rotation during its period of finding the indent of an apple in a given cup. This is accomplished by an alternate rack and pinion drive for rotating the finder wheels.

Figures 16, 17:
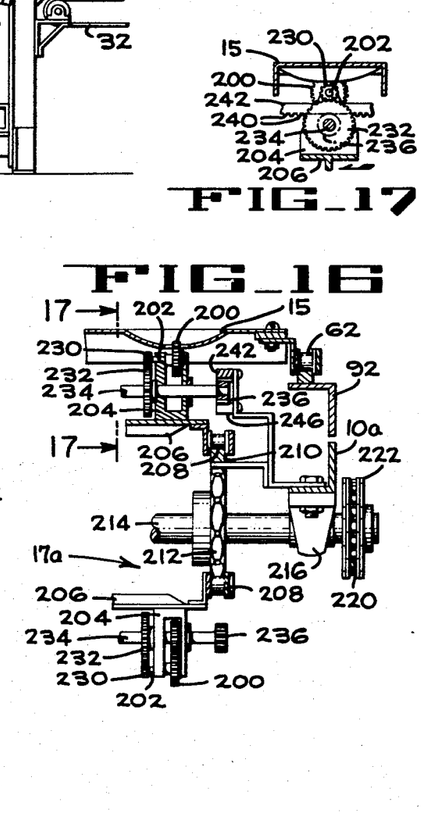
FIG. 16 is a section taken on line 16—16 of FIG. 15.
FIG. 17 is a section taken on line 17—17 of FIG. 16.

The finder wheels shafts 202 have small pinions 230 meshed with gears 232 on a shaft 234 (FIG. 16). Each shaft 234 extends across the machine and rotates in the brackets 204 previously described. At the other end of each shaft 234 is a drive pinion 236 for the shaft.

Figure 15:
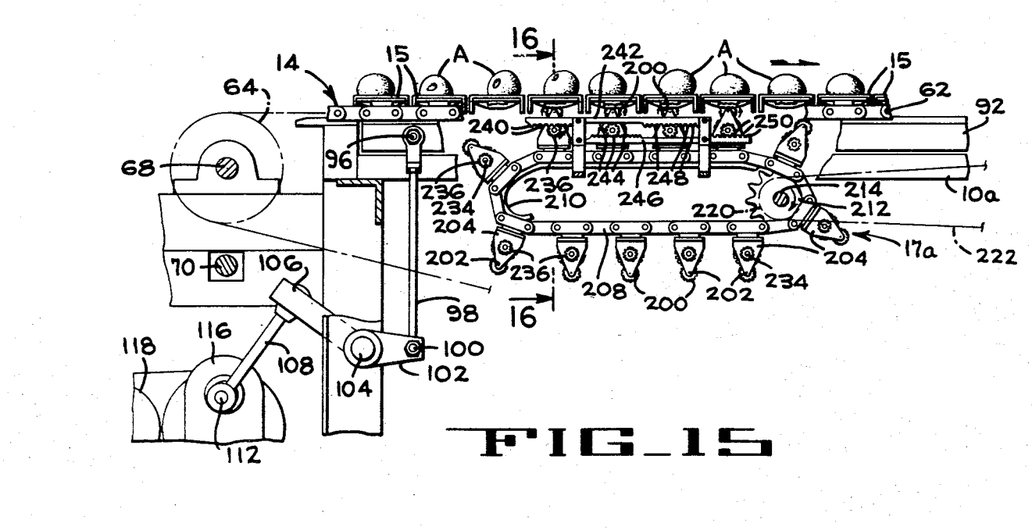
FIG. 15 is a fragmentary side elevation drawn to large scale.

As the finder-wheel chains 208 advance the finder-wheel brackets 204, the drive pinion 236 for the associated finder wheel 200 first engages a first set of teeth 240 on an upper dual rack 242 rotating the finder wheel in one direction (FIG. 15). The pinion 236 next engages a second set of teeth 244 on a lower dual rack 246 for reversing rotation of the finding wheel. The pinion then engages a third set of teeth 248 on the upper rack 242 for rotating the finder wheel in its original direction of rotation. Finally the pinion engages a fourth set of teeth 250 on the lower rack 246, again reversing the direction of finding wheel rotation. The gear and pinion drive 230–232 steps up the speed of rotation of the finder wheels.

Thus it can be seen that although the finder wheels of this form of the invention engage the apples in their respective cups over a longer period of time, the general mode of operation is like that of the first embodiment, including the vertical vibration of the cup conveyor during the finding operation by means of the motor 118 and the linkage 98 connected to the subframe 92 that supports the orienting section of the cup conveyor.

Although the best mode contemplated for carrying out the present invention has been herein shown and described, it will be apparent that modification and variation may be made without departing from what is regarded to be the subject matter of the invention.

What is claimed is:

1. Apparatus for finding the indents of fruits such as apples and peaches or the like preparatory to coring, said apparatus being of the type wherein the fruits are advanced in an open cup conveyor along a frame, and wherein rotating indent-finder wheels project up through apertures in the cups and advance therewith for tumbling the fruit until the indents are found; the improvement wherein said cups have concave bottoms that are at least as large as the largest fruit in the normal range of fruit sizes, said fruit being unconfined by retainer rings or the like disposed above the cups, and means for vertically vibrating said cups over a stroke of one-sixteenth inch to five thirty-seconds inch while the finder wheels are tumbling the fruit.

2. The apparatus of claim 1, wherein means are provided for causing the finder wheels to run in successively opposite directions for picking up fruits that have been tumbled to one side of their respective cups by previous wheels.

3. The apparatus of claim 2, comprising means for advancing all finder wheels with said conveyor over a distance somewhat less than the longitudinal spacing between cups, means for retracting the finder wheels and means for then reintroducing the wheels to a new set of cups just downstream of those in which the wheels were previously operating.

4. The apparatus of claim 2, wherein said finder wheels are mounted on endless chains, and means for advancing said chains in synchronism with said cup conveyor over a distance represented by the spacing of a plurality of adjacent cups.

5. The apparatus of claim 1, wherein said cups are vibrated at a frequency of between about 200 to 675 cycles per minute.

6. The apparatus of claim 1, wherein said cups are given a stroke of about five thirty-seconds of an inch and are vibrated at a frequency of about 200 cycles per minute.

7. The apparatus of claim 1, wherein said means for vertically vibrating the cups comprises platform means for supporting the sides of a reach of said cup conveyor, means for pivotally mounting a downstream portion of said platform means on the frame, and means for vertically oscillating an upstream portion of said platform means.

8. In an apple-coring machine or the like of the type comprising a longitudinal main frame, an endless open cup conveyor for the fruit, a reciprocating coring carriage on said main frame, and means for reciprocating said carriage in synchronism with said conveyor for coring oriented apples in the cups on said conveyor while the conveyor is moving; the improvement comprising a finder-wheel carriage mounted for both longitudinal and vertical reciprocation relative to said main frame and beneath said cup conveyor, means for reciprocating said finder-wheel carriage longitudinally and in synchronism with said coring carriage, rows of indent-finder wheels associated with said conveyor cups and rotatably mounted on said finder-wheel carriage, means for rotating said finder wheels as their carriage advances with said cup conveyor, means for lowering said finder-wheel carriage upon termination of the advance stroke of the carriage for withdrawing the wheels from their respective cups, and means for raising said finder-wheel carriage upon termination of the retract stroke of the carriage for inserting the finder wheels into conveyor cups downstream of those from which the finder wheels were withdrawn.

9. The apparatus of claim 8, wherein said means for longitudinally reciprocating said finder-wheel carriage comprises link means connecting said finder wheel and coring carriages.

10. The apparatus of claim 9, wherein said means for vertically reciprocating said finder-wheel carriage comprises bellcrank means pivoted on said coring carriage, direction-changing link means connected between one end of said coring carriage bellcrank means and said finder-wheel carriage for vertically reciprocating said carriage, and means for reciprocating the other end of said bellcrank means in synchronism with the reciprocation of said coring carriage.

11. The apparatus of claim 10, wherein said direction-changing link means for vertically reciprocating said finder-wheel carriage comprises paired lifter bellcranks having their intermediate pivots on said finder-wheel carriage, their pivots at one end slidably mounted on said main frame, and with their pivots at the other end being linked to said coring carriage bellcrank means.

12. The apparatus of claim 8, wherein said means for rotating the finder wheels comprises sprockets for driving the wheels, a chain looped sinuously over adjacent sprockets for driving them in alternately reversed directions and means for driving said chain.

13. The apparatus of claim 8, wherein said cup conveyor has driving side chains running along said main frame, platform means for supporting said side chains at said finder carriage, means for pivotally mounting a downstream portion of said platform means on said main frame, and means for vertically oscillating an upstream portion of said platform means.

14. The apparatus of claim 13, wherein said platform means is oscillated through a stroke of about one-sixteenth inch to five thirty-seconds inch at a frequency of about 200 to 675 cycles per minute.

PO-1050
(5/69)

UNITED STATES PATENT OFFICE
CERTIFICATE OF CORRECTION

Patent No. 3,602,281                Dated August 31, 1971

Inventor(s) GERALD R. ANDERSON ET AL

It is certified that error appears in the above-identified patent and that said Letters Patent are hereby corrected as shown below:

Column 1, line 5:     change "of" to --or--;

line 24:     change "2,232,208" to --2,232,209--;

line 43:     after "1,859" insert --cycles--.

Column 6, line 73:     change "passed" to --advanced.

Column 7, line 69:     change "find" to --finder-- (first occurrence).

Signed and sealed this 15th day of August 1972.

(SEAL)
Attest:

EDWARD M. FLETCHER, JR.           ROBERT GOTTSCHALK
Attesting Officer                 Commissioner of Patents